United States Patent [19]

Baker et al.

[11] Patent Number: 4,862,062

[45] Date of Patent: Aug. 29, 1989

[54] GLASS CONTAINER INSPECTION MACHINE

[75] Inventors: Russ J. Baker, Horseheads; Robert A. Hansen, Elmira, both of N.Y.; Paul F. Scott, Hartford, Conn.; Edward F. Vozenilek, Elmira, N.Y.

[73] Assignee: Emhart Industries, Inc., Indianapolis, Ind.

[21] Appl. No.: 253,832

[22] Filed: Oct. 5, 1988

[51] Int. Cl.⁴ ............................................ G01R 27/26
[52] U.S. Cl. .................................. 324/61 R; 209/523
[58] Field of Search ............. 324/61 R, 519; 209/523, 209/530

[56] References Cited

U.S. PATENT DOCUMENTS

| | | | |
|---|---|---|---|
| 2,573,824 | 11/1951 | Baker | 324/61 R |
| 2,601,649 | 7/1952 | Wadman | 324/61 R |
| 2,616,068 | 10/1952 | McDonald | 324/61 R |
| 4,658,254 | 4/1987 | Walton | 324/61 R |

Primary Examiner—Reinhard J. Eisenzopf
Assistant Examiner—Maura K. Regan
Attorney, Agent, or Firm—Carl A. Forest

[57] ABSTRACT

A selected number of data samples is taken around the periphery of the wall of a container to determine the voltages corresponding to the thinnest and thickest wall locations. These two voltages are then converted to dimensions and a minimum to maximum ratio is calculated using these two dimensions. Where this ratio is lower than a minimum settable value, the bottle will be rejected.

4 Claims, 4 Drawing Sheets

FIG. 2

```
         ↓ SAMPLE VOLTAGE #N
      ┌──────────┐
      │ REJECT   │
      │ NOISE    │
      └────┬─────┘
           ↓
      ┌──────────┐
      │ DETECT THE│
      │   SEAM   │
      └────┬─────┘
           ↓
      ╱IS VOLTAGE╲    YES     ┌──────────┐
     ╱ LOWER THAN ╲──────────→│ UPDATE   │
     ╲  LOWEST    ╱           │ MINIMUM  │
      ╲          ╱            │ VOLTAGE  │
           ↓                  │ REGISTER │
                              └──────────┘
      ╱IS VOLTAGE╲    YES     ┌──────────┐
     ╱HIGHER THAN ╲──────────→│ UPDATE   │
     ╲  HIGHEST   ╱           │ MAXIMUM  │
      ╲          ╱            │ VOLTAGE  │
           ↓                  │ REGISTER │
                              └──────────┘
      ╱IS SAMPLE ╲    YES     ┌──────────┐
     ╱    RUN    ╲──────────→│ TRANSLATE│
     ╲ COMPLETED ╱            │ MIN. VOLT│
      ╲         ╱             │TO DIMENSION│
                              └────┬─────┘
                                   ↓
                              ┌──────────┐
                              │ TRANSLATE│
                              │ MAX. VOLT│
                              │TO DIMENSION│
                              └────┬─────┘
                                   ↓
                              ┌──────────┐
                              │  CLEAR   │
                              │MAX. AND MIN│
                              │ REGISTERS│
                              └────┬─────┘
                                   ↓
                    YES       ╱IS MIN.DIM╲
      ┌─────────┐◄───────────╱   ≤ MIN.   ╲
      │         │            ╲  SET PIONT ╱
      │         │             ╲          ╱
      │         │                  ↓
      │ REJECT  │   YES       ╱IS MAX. DIM╲
      │ BOTTLE  │◄───────────╱  ≥ MAX. SET ╲
      │         │            ╲    PIONT    ╱
      │         │             ╲           ╱
      │         │                  ↓
      │         │   YES       ╱IS MIN./MAX╲
      │         │◄───────────╱    RATIO    ╲
      └─────────┘            ╲    ≤ SET    ╱
                              ╲   PIONT   ╱
                                   ↓
```

GLASS CONTAINER INSPECTION MACHINE

SPECIFICATION

A bottle is formed from a gob of molten glass in an individual section glass container forming machine by first pressing or blowing the gob in a blank mold into a parison and then blowing the formed parison into a container in a finish mold. When glass is uniformly distributed during the formation of the container, wall thickness will be uniform, but when glass distribution is not uniform, thin spots can occur and these thin spots may result in bottle failure during filling or handling.

Historically, thin spots were identified by slicing a formed bottle and performing measurements along the cut wall to find locations which were unacceptably thin relative to the rest of the wall. When thin spots were found, the forming process was evaluated to find out why the glass was not being uniformly distributed.

Technology has been developed which makes use of the high dielectric constant of glass by measuring the capacitance of the glass wall between two elongated electrodes which contact the bottle as it is rolled along the sensor. The head of the sensor communicates with an oscillator which generates a voltage which is representative of the thickness of the wall. This voltage is continuously generated as the bottle rolls along the elongated sensor and if this voltage decreases below a selected value (the value representative of the minimal acceptable bottle thickness), the bottle is rejected for having a thin spot.

It is an object of the present invention to provide a bottle inspection apparatus which not only will reject a bottle when an unacceptable thin spot is identified, but will also reject the bottle whenever there is an unacceptable non-uniform distribution of glass in the formed bottle.

Other objects and advantages of the present invention will become apparent from the following portion of the specification and from the following drawings which illustrate in accordance with the mandate of the patent statutes a presently preferred embodiment incorporating the principles of the invention.

Referring to the drawings:

FIG. 2 is a logic diagram illustrating the operation of the machine's controller to determine whether an inspected container should be rejected.

Figure 1:
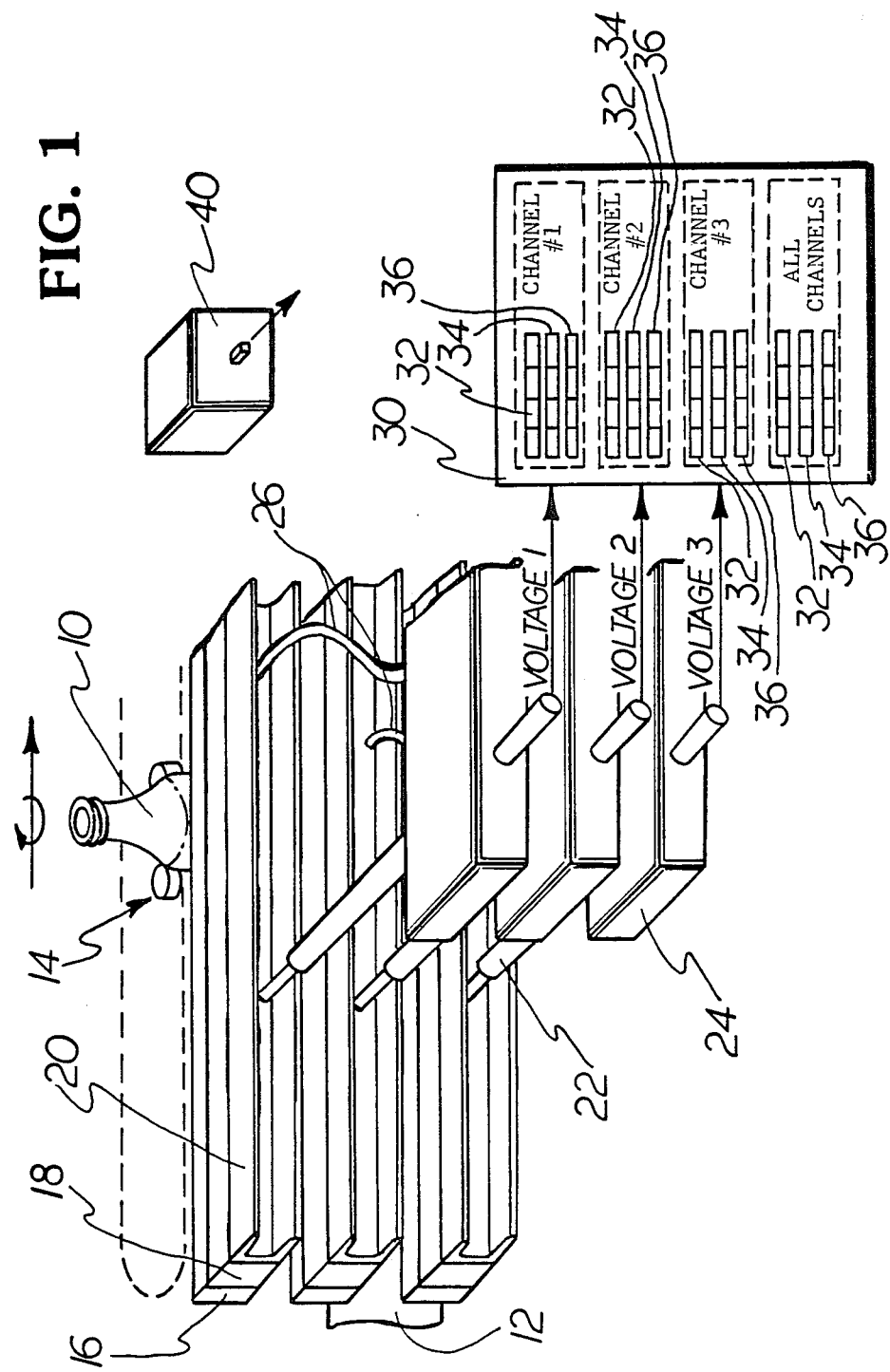
FIG. 1 is an oblique view of the inspection station of a glass container inspection machine.

The glass container inspection machine has a station for testing a formed container or bottle 10 which is supported by a support plate 12 and which is advanced along the support plate 12 by a bottle carrier 14. During its displacement past the test station, the carrier 14 forces the bottle against a number (three as illustrated in FIG. 1 for purposes of clarity, but four are normally used) of parallel horizontally extending, vertically spaced capacitance sensing strips 16 which are secured to resilient foam strips 18 mounted on suitable brackets 20. The brackets are connected by posts 22 to corresponding head oscillator assembly housings 24. Each oscillator receives a capacitance signal from its associated capacitance sensing strip via a calibrated cable 26 and generates a continuous voltage signal which is supplied to a computer 30.

The machine operator defines minimum wall thickness 32, maximum wall thickness 34, and minimum/maximum wall thickness ratio 36 set points for each sensor by entering this data into the computer (for purposes of illustration these inputs are schematically shown as settable thumb wheel switches).

As can be seen from the flow diagram illustrated in FIG. 2, the voltage signal generated by each oscillator is processed to Reject Noise (by averaging, for example). The Detect The Seam circuit determines that data in the vicinity of a seam is being generated and ignores this data which would produce a false thin spot reading. Two to three hundred readings or data samples are taken around the bottle at each sensor and then evaluated to identify the lowest and highest voltage around the bottle. These voltages are stored in suitable registers which are updated whenever a lower or higher voltage is sensed until readings have been taken completely around the bottle. In terms of the claims, the first means for determining the smallest sampled voltage comprises computer 30, particularly minimum wall thickness switches 32, and the second means for determining the highest sampled thickness comprises computer 30, particularly the maximum wall thickness switches 34. A highest voltage and lowest voltage register can be provided for each sensor (channel) and a highest and lowest register can be provided for the data of all the sensors (channels). At this time, the voltage which represents the thinnest spot around the tested periphery (either for one or for all channels) and the voltage which represents the thickest spot around the tested periphery (either for one or for all channels) are converted via suitable A/D converters to dimensions (millimeter for example) and the registers are cleared for the next bottle. If the minimum dimension is less than the minimum set point, or if the maximum dimension is higher than the maximum set point or if the minimum to maximum ratio for these two dimensions is less than the minimum to maximum set point, the bottle will be rejected by a suitable reject mechanism 40.

Figure 3:
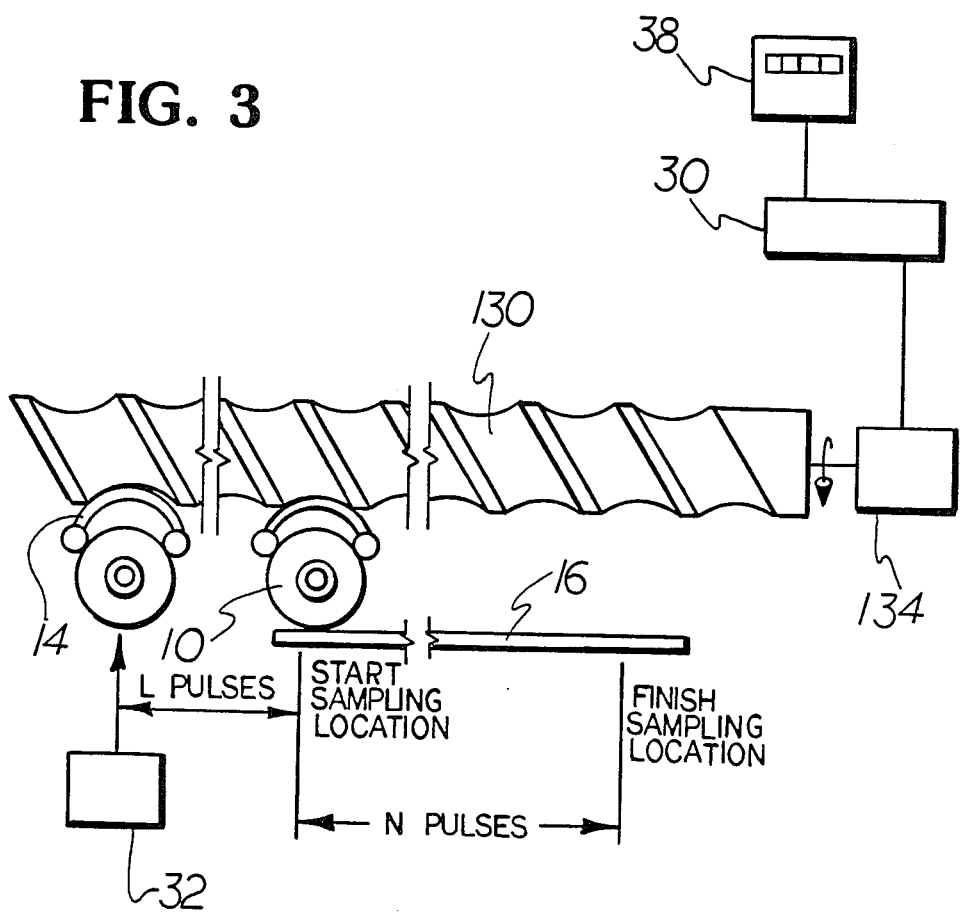
FIG. 3 is a schematic illustration of the mechanism for advancing the bottles through the test station.

FIG. 3 schematically illustrates the system for advancing the bottles to and through the test station. This system includes an elongated cam 130 which rotates at a constant speed. The cam engages a carrier 14 at a start position which is sensed by a suitable sensor 16. The rotational position of the cam is monitored by an encoder 134 and the encoder reading when the carrier is at this start position is defined as the start pulse by the computer 30. As the cam continues to advance the carrier 14, a captured bottle 10 will be translated towards the right until the bottle engages the capacitance strip 16 and reaches a desired start sampling location defined by a selected encoder count (L). The sampling will then take place with a data sample evaluated by the means for sampling comprising the computer 30 at each subsequent count until the count reaches a selected number (N) which assures that the entire periphery of the bottle has been sampled (the Finish Sampling Location). For smaller bottles, a portion of this peripheral ring will be analyzed twice. The operator inputs the diameter of the bottle via a hand held terminal or the like 38 and the computer sets the correct N number for the bottle.

Figure 4:
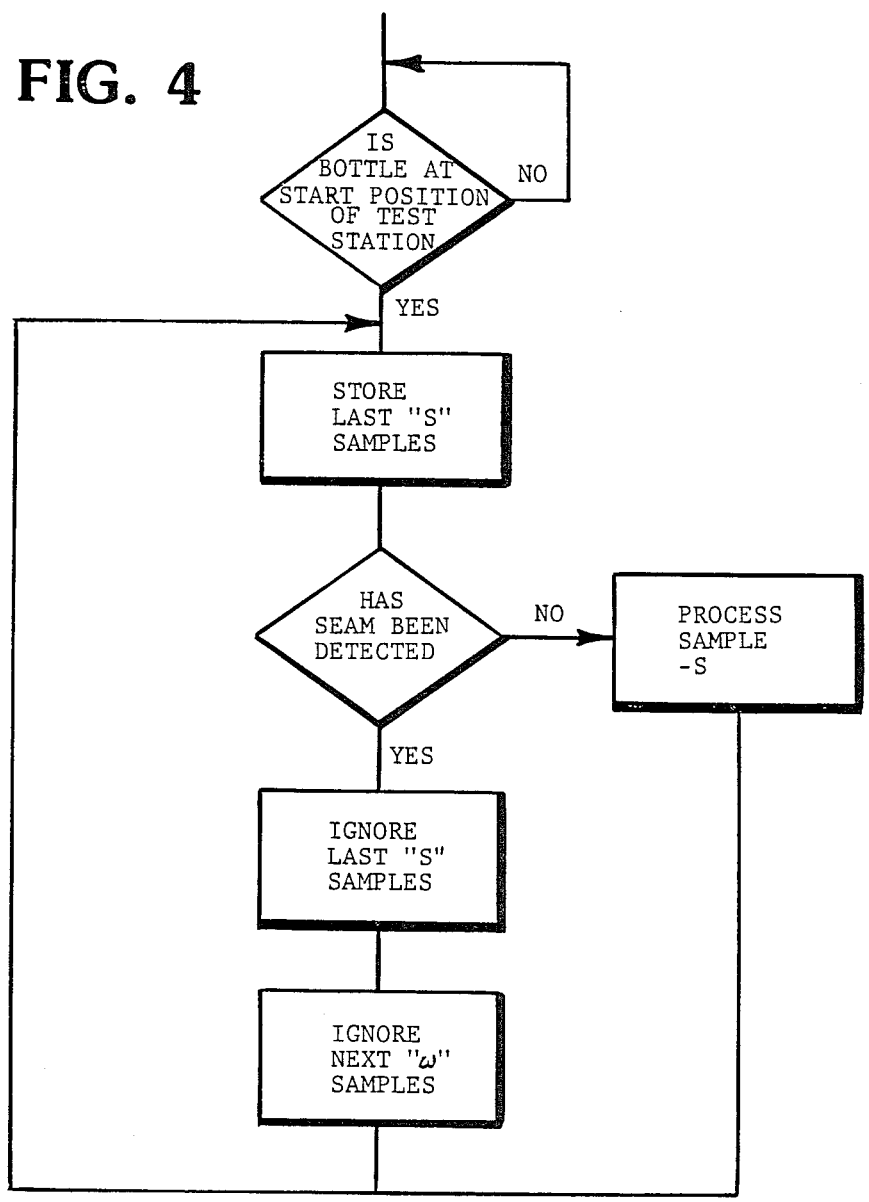
FIG. 4 is a flow chart illustrating the algorithm for defining the window during which data sampled proximate a seam will be ignored.

As can be seen from FIG. 4, the last "S" (four, for example) data samples are stored in a Store Case "S"

Sample and each time a new data sample is placed in storage, the oldest data sample is processed by the Process Sample - S. A data sample will accordingly be evaluated at each pulse until the bottle wall seam has been detected by a conventional seam detector 30. At this time, all the sample data in the Store Case "S" samples will be ignored as will future data samples for a "W" pulse count. "S" and "W" are settable to cover a selected window during which seam data would normally be evaluated. Following the counting of "W" pulses, the sample data will again be evaluated each pulse until the Finish Sampling Location is reached.

We claim:

1. An apparatus for testing a glass container comprising
   elongated capacitance sensing means
   means for forcefully rolling the wall of a glass container along said elongated capacitance sensing means,
   oscillator means for generating a voltage representative of the sensed capacitance,
   means for sampling the voltage generated by said oscillator means at a selected number of sample locations around the wall of the rolling glass container,
   first means for determining the smallest sampled voltage which is representative of the thinnest sampled location of the glass container,
   second means for determining the highest sampled voltage which is representative of the thickest sampled location of the glass container,
   means for translating said determined lowest and highest voltages to minimum and maximum dimensions and
   means for determining the ratio of said minimum to maximum dimensions and
   means for operating rejecting a glass container whenever the ratio of said minimum to maximum dimension is lower than a selected value.

2. An apparatus for testing a glass container according to claim 1 further comprising
   means for selecting said selected minimum to maximum ratio.

3. An apparatus for testing a glass container according to claim 1 wherein said elongated capacitance sensing means comprises a plurality of equally spaced capacitance sensors and said first and second determining means determine said lowest and highest sampled voltage for each sensor.

4. An apparatus for testing a glass container according to claim 1 wherein said elongated capacitance sensing means comprises a plurality of equally spaced capacitance sensors and said first and second determining means determine said lowest and highest sampled voltage for all sensors.

* * * * *

UNITED STATES PATENT AND TRADEMARK OFFICE
CERTIFICATE OF CORRECTION

PATENT NO. : 4,862,062
DATED : August 29, 1989
INVENTOR(S) : Russ J. Baker, Robert A. Hansen, Paul F. Scott, Edward F. Vozenilek It is certified that error appears in the above—identified patent and that said Letters Patent is hereby corrected as shown below:

In column 4, line 9, cancel the word "operating".

Signed and Sealed this

First Day of January, 1991

Attest:

HARRY F. MANBECK, JR.

Attesting Officer

Commissioner of Patents and Trademarks